2,982,048
Patented May 2, 1961

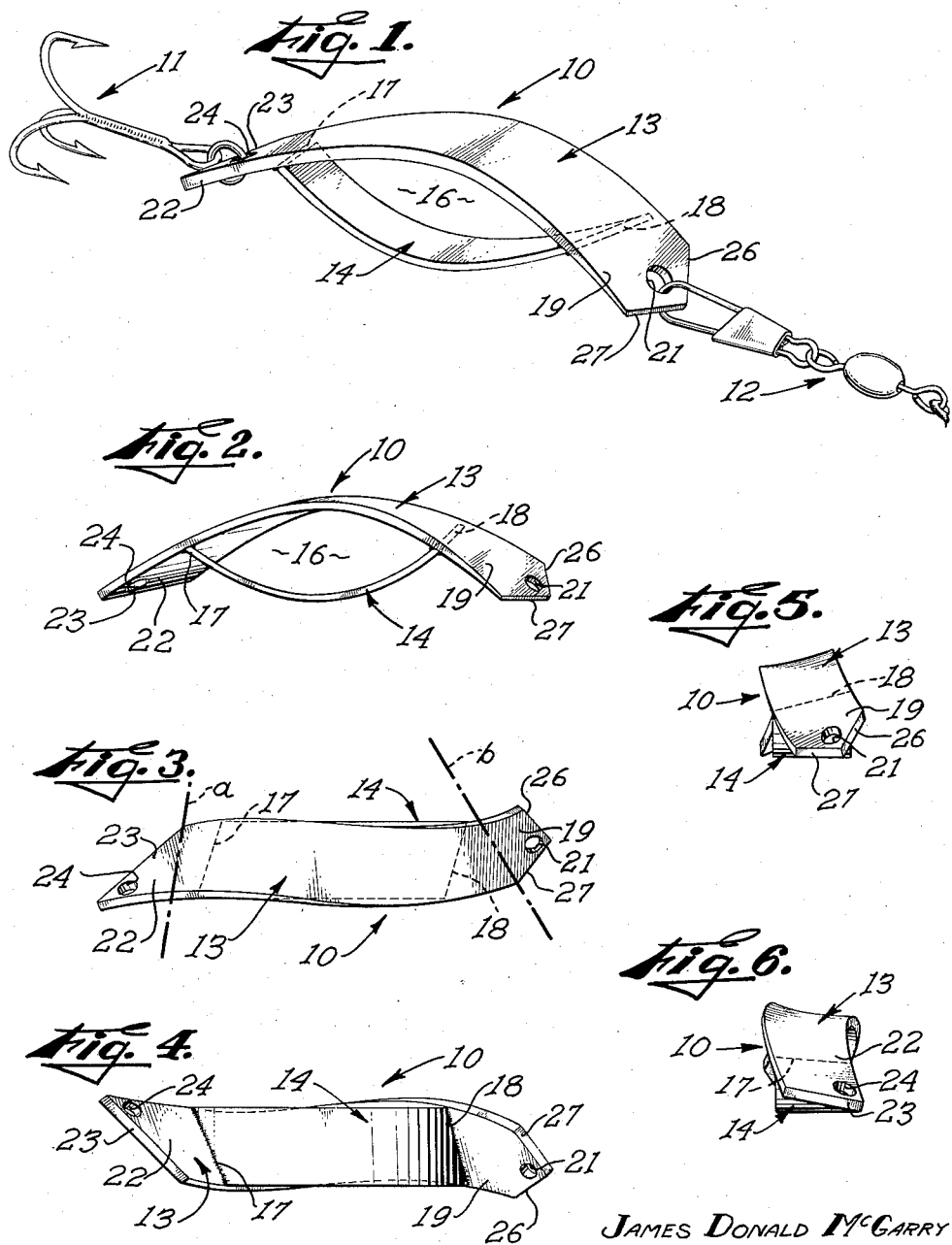

2,982,048
FISH LURE

James D. McGarry, San Bernardino, and Richard L. Daniels, San Carlos, Calif., assignors, by mesne assignments, to The Garcia Corporation, New York, N.Y., a corporation of New York Continuation of application Ser. No. 630,246, Dec. 24, 1956. This application Sept. 25, 1958, Ser. No. 764,479

11 Claims. (Cl. 43—42.06)

This invention relates to a fish lure, and more particularly to a lure especially adapted for catching fresh water fish such as trout, bass and the like. This application is a continuation of our co-pending patent application Serial No. 630,246, filed December 24, 1956, for a Fish Lure, now abandoned.

A principal object of the present invention is to provide a fish lure which has a very high efficiency and effectiveness in luring and catching fish.

A further object is to provide a fish lure which is attractive in appearance, and which has a substantial sales appeal when displayed on store counters.

An additional object is to provide a fish lure which is simple and economical to construct, which is rugged and long-lasting, and which does not have any moving parts other than the leader and hook elements.

These and other objects and advantages of the invention will be more fully set forth in the following specification and claims, considered in connection with the attached drawing to which they relate.

In the drawing:

Figure 1 is an enlarged perspective view illustrating a fish lure constructed in accordance with the present invention;

Figure 2 is an enlarged view of one side of the fish lure, but with the leader and hook means removed;

Figure 3 is a top plan view of the body of the fish lure;

Figure 4 is a bottom plan view of the fish lure body;

Figure 5 is an elevation of the front end of the lure body; and

Figure 6 is an elevation of the rear end of the body.

Referring to the drawing, the fish lure may be seen to comprise generally a body 10, hook means 11 connected to the rear end of the body, and means 12 provided at the front end of the body and adapted to secure the same to a fish line. Stated generally, body 10 comprises two arcuate metal strips 13 and 14 connected together at their end portions, and bowing in opposite directions so as to form between them an elongated recess or opening 16 shaped generally as a double pointed ellipse. Strip 13 is longer than strip 14, so that these strips may be termed, respectively, long and short although it is to be understood that such designations denote relative length only.

Strips 13 and 14 are formed of a shiny metal such as copper or stainless steel. Preferably, the long strip 13 is formed of copper, and the short strip 14 of stainless steel. One or more sides of the strips 13 and 14 may be painted, or otherwise covered, with a shiny coating of a desired color.

The extreme ends of short strip 14 are rigidly secured, preferably by soldering or welding, to the end portions of long strip 13 but at points spaced from the extreme ends thereof. The weld or solder lines or joints which connect the ends of strip 14 to strip 13 are designated 17 and 18. It is pointed out that such joints lie along the inner or interior face or side of long strip 13.

In greater detail, the long strip 13 has a front or nose portion 19 lying forwardly of the joint 18. At its extreme front end, the nose portion 19 is pointed or triangular, being provided at its center with a hole 21 forming part of the means 12 and adapted to receive a line, leader clip, etc. The rear end or tail portion 22 of long strip 13, to the rear of joint 17, is cut off along an oblique edge or line 23 and is provided at its extreme rear apex with a hole 24 for the hook means 11. The hook means are illustrated to comprise a conventional three-prong fish hook.

From the above it will be seen that the extreme front and rear portions of long strip 13 are both generally triangular, but that the front portion is formed with two convergent forward edges 26 and 27 which meet at a point in advance of hole 21, whereas the rear portion is formed with only one oblique edge 23 as previously stated.

Long strip 13 is not only arcuate or bowed, as previously indicated, but is also twisted gradually along its length so that the angle between the extreme front and rear end portions thereof is from 45 to 90°. Stated otherwise, lines a and b, indicated in Figure 3, which lie in one side surface of the long strip and in spaced parallel planes transverse to the long strip, are disposed at an angle of from 45 to 90° relative to each other.

The long strip 13 curves generally about a point and through about 65 to 85° of a circle. In a preferred form, such circle has a radius of about 1¼ inches. The short strip 14 is also curved generally about a point, through about 75° of a circle. The short strip has a substantially shorter radius than the long strip, or about ¾ inch in the above-mentioned preferred form. The short strip 14, however, is twisted very little, if at all, and is cut at its ends so that it will intersect the inner face of long strip 13 along the straight line joints 17 and 18 previously referred to.

In operation, the present lure swerves from side to side, with a peculiar action, as it is drawn through the water. Such action is due largely to the flow of water through the opening 16, as well as along the surfaces of strips 13 and 14 which are curved or twisted as above described.

In highly controlled comparison tests between the present lure and conventional lures for bass, trout and the like, the present lure had a relatively high effectiveness in the hooking of the fish. Such tests took place in stocked ponds swarming with fish, and were performed by anglers casting from the same points at the same times over controlled periods. Casting distances, type of reel in, etc., were carefully controlled to eliminate all possible variables. Furthermore, the lures were interchanged between casters. The results showed that the present lure caught from 3 to 5 times as many fish, per given number of casts, as conventional lures.

Various embodiments of the present invention, in addition to what has been illustrated and described in detail, may be employed without departing from the scope of the accompanying claims.

We claim:
1. A fish lure, which comprises a relatively long metal strip which is curved or bowed along its length and is also twisted through an angle less than about 90°; a relatively short metal strip which is curved and is substantially free of twist, means to fixedly connect the ends of said short strip to one side surface of said long strip at points spaced from the opposite ends of said long strip, said short strip being so oriented realtive to said long strip that it is bowed in the opposite direction to form an elongated opening between said strips, a hook connected to one end of said long strip, and line attaching means provided at the other end of said long strip.

2. The invention as claimed in claim 1, in which said connecting means comprise fused joints.

3. The invention as claimed in claim 1, in which said one end of said long strip is cut along an oblique line, and said hook is connected to the extreme pointed end formed by said oblique line.

4. The invention as claimed in claim 1, in which said other end of said long strip is formed with two angularly related converging edges which meet at a point, and said line attaching means is located adjacent said point.

5. A fish lure, comprising a relatively long metal strip which is curved through an arc of a circle, said long strip also twisting gradually from end to end through a substantial angle less than 90°, a relatively short strip curving about a shorter radius than said long strip through an arc of a circle, said short strip being relatively free of twist and being fixedly secured at its end portions to the interior concave surface of said long strip, said strips being of substantially equal width and curving in opposite directions to form a double-pointed opening therebetween, the intersections between said short strip and said interior concave surface of said long strip being spaced substantial distances from the ends of said long strip, the front end of said long strip being formed with two forwardly converging edges which meet at a point approximately midway between the longitudinal side edges of said long strip, means provided adjacent said point to secure a line to said front end of said long strip, the rear end of said long strip being formed as a straight oblique edge which meets one of said longitudinal side edges of said long strip at a relatively sharp point, and means provided adjacent said relatively sharp point to secure a hook to said rear end of said long strip.

6. An elongated artificial fish lure having a side-to-side swerving action as it is drawn through the water, which comprises first strip means extending along substantially the full length of a relatively long generally arcuate path, said first strip means being gradually twisted along its length through a substantial angle less than 90°, second strip means having generally the same width as said first strip means and extending along substantially the full length of a relatively short generally bowed or arcuate path, said second strip means being relatively free of twist, means to fixedly connect said first strip means and said second strip means to maintain the same opposite and facing each other and bowing in opposite directions to define an elongated opening therebetween through which water may freely flow, line attaching means provided at one end portion of said lure, and hook attaching means provided at the other end portion of said lure and offset laterally from the longitudinal axis thereof.

7. An elongated artificial fish lure having a peculiar side-to-side swerving action as it is drawn through the water, which comprises a first metal strip having generally parallel edges, said first strip being arcuate and having a gradual or progressive twist through a substantial angle less than 90°, line attaching means provided at one end of said first strip, hook attaching means provided at the other end of said first strip, a second metal strip having generally parallel edges and of approximately the same width as said first strip, at least the majority of the length of said second strip being shaped as an arc which is substantially free of twist, said arc of said second strip being disposed entirely on the concave side of said first strip, and means to fixedly secure said second strip to said first strip at such location that the ends of said arc of said second strip meet the concave surface of said first strip along meeting lines which are spaced substantial distances inwardly from said line attaching means and from said hook attaching means, said arc of said second strip facing and being opposite in direction to said first strip to thereby define an elongated opening therebetween having apexes at said lines of meeting, the depth of said opening being substantially equal to the widths of said strips.

8. The invention as claimed in claim 7, in which said one end of said first strip is provided with two forwardly convergent edges which meet at a central point, in which said other end of said first strip extends obliquely rearwardly to meet an edge of said first strip at an edge point, in which said meeting lines are generally parallel to each other and extend rearwardly and obliquely, in which said line attaching means is located at said central point, and in which said hook attaching means is located at said edge point.

9. A fish lure, which comprises a body formed of two arcuate strips bowed in opposite directions and the end portions only of one strip being connected to the side portion of the other strip, one of said strips being substantially free of twist and the other of said strips being twisted about its longitudinal axis through an angle which is less than 180° between the end portions of said strip, hook means provided at one end of said body and offset laterally from the longitudinal axis of said strip, and line attaching means provided at the other end of said body.

10. An elongated artificial fish lure, having a peculiar side to side swerving action as it is drawn through the water, which comprises, first strip means extending substantially along an arcuate path, second strip means extending substantially along an arcuate path of different radius than the arc of said first strip, means to fixedly associate said first strip means and said second means to maintain the same in predetermined positions opposite and facing each other to bow in opposite directions to define an elongated opening therebetween, said first strip means being twisted along its length through a substantial angle, line attaching means provided at one end portion of said lure, and hook attaching means provided at the other end portion of said lure.

11. An elongated artificial fish lure, having a peculiar side to side swerving action as it is drawn through the water, which comprises, first strip means extending substantially along an arcuate path, second strip means extending substantially along an arc of different radius than the arc of said first strip, means to fixedly associate said first strip means and said second means to maintain the same in predetermined positions opposite and facing each other to bow in opposite directions to define an elongated opening therebetween, at least one of said strip means being twisted along its length through a substantial angle greater in twist than may be formed in said other strip means, line attaching means provided at one end portion of said lure, and hook attaching means provided at the other end portion of said lure.

References Cited in the file of this patent

UNITED STATES PATENTS

| | | |
|---|---|---|
| D. 152,542 | Howard | Feb. 1, 1949 |
| 962,319 | Crosby | June 21, 1910 |
| 2,632,276 | Hale | Mar. 24, 1953 |
| 2,833,077 | Benoit | May 6, 1958 |